Dec. 29, 1964   J. C. WITTWER   3,163,842
HOUSING FOR ELECTRICAL UNIT
Filed Jan. 29, 1962   2 Sheets-Sheet 1

INVENTOR.
JOHN C. WITTWER
BY Ray C. Hopgood
ATTORNEY

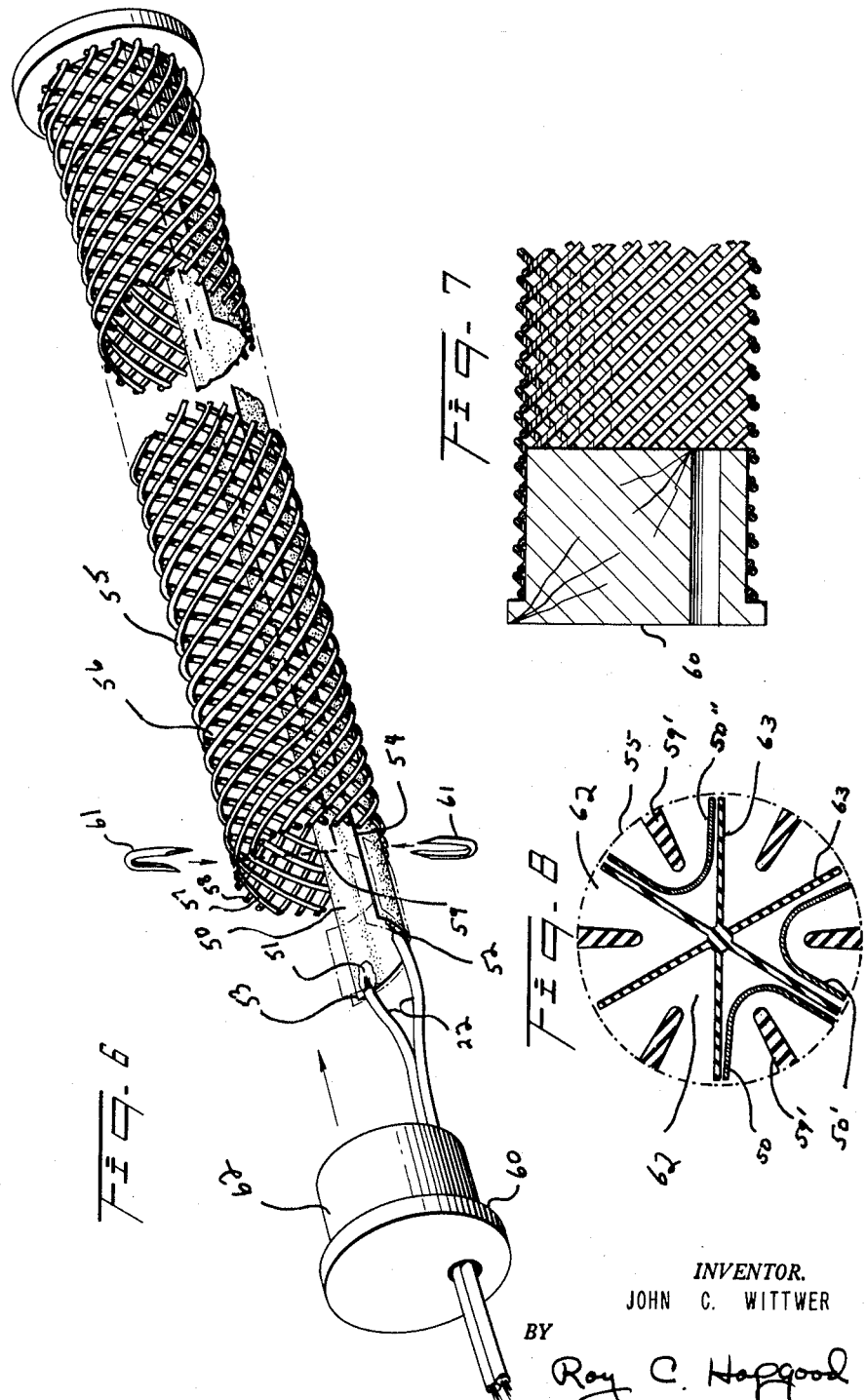

United States Patent Office 3,163,842
Patented Dec. 29, 1964

3,163,842
HOUSING FOR ELECTRICAL UNIT
John C. Wittwer, R.F.D. 2, Mount Kisco, N.Y.
Filed Jan. 29, 1962, Ser. No. 172,040
14 Claims. (Cl. 338—317)

This invention, generally, relates to enclosures for electrical units and, more particularly, to an elongated housing having an appropriate electrical element such as, for example, an electric heater or an illuminating element.

Reference is made to copending application Serial No. 40,088 filed June 30, 1960, now abandoned, of which this application is a continuation-in-part.

It is the principal object of the invention to provide a housing to enclose and support an elongated electrical element.

Another object of the invention is to provide a housing with an integrally formed support for a radiating electrical element.

Still another object of the invention is to provide a new and improved enclosure or housing for an electrical radiating element.

Briefly, the invention provides a tubular housing of predetermined length and diameter with a partition one edge of which is formed integrally with the tubular portion of the housing to provide two elongated chambers. The length of the partition is substantially equal to the predetermined length of the outer tubular portion, and the width of the partition is less than the diameter of the outer tubular portion to define a slot between the two chambers.

An appropriate electrical unit such as, for example, a tape-like heating element or illuminating element is positioned within the tubular portion of the housing through the slot defined by one edge of the partition and with the longitudinal edges of the tape in the respective chambers. An electrical connection for the unit is provided at one end of the housing, and each end of the housing is sealed by a cap applied thereto.

In one aspect of the invention, the electrical unit comprises a conductive heating tape having a resistivity sufficient to produce heat when it is connected suitably to electrical energy. This type of heating tape has conductive edges along the extending edges. The heating tape is bent or folded and placed in the housing and the barrier serves to retain the conductive edges in spaced apart insulative relationship.

It will be understood that the term "tubular" as used in the description to follow is not limited to a particular cross sectional configuration, such as round, square, hexagonal, etc.

The above and other objects and advantages of the invention will become apparent from the following detailed description taken in conjunction with the accompanying drawing, in which:

FIG. 5 is a perspective partial view illustrating one different cross section shape which the housing of the invention may be provided with;

FIG. 6 is a partially exploded view in perspective with a portion cut away to illustrate another aspect of the invention;

FIG. 7 is a fragmentary view in cross section of one end of the arrangement shown in FIG. 6; and FIG. 8 is a cross sectional view of a modified form of the invention shown in FIG. 6.

Figure 1:
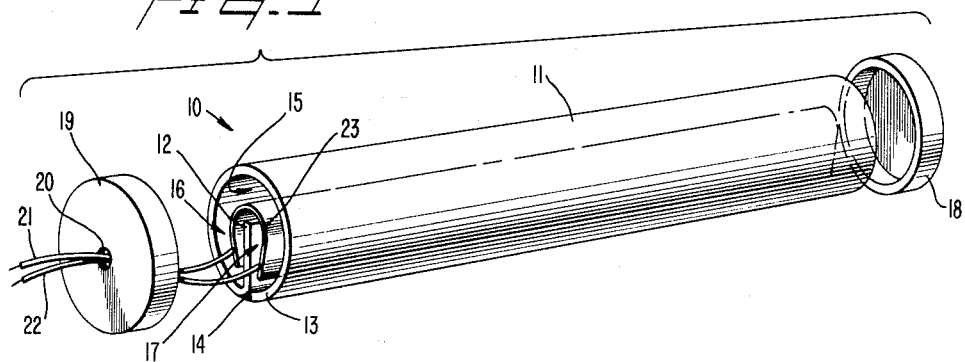
FIG. 1 is a perspective exploded view of a housing in accordance with a preferred form of the invention.

Referring now to FIG. 1, the housing 10 is provided with an elongated tubular portion 11, the length of which is predetermined in accordance with a particular use of the unit. Although the housing 10 may be formed in a single step, for example, by extrusion, the form of the invention shown in FIG. 1 is made from a single flat sheet, wherein one end 12 is bent inwardly to form a partition extending along the diameter of the tube 11.

The opposite end 13 of the tubular portion 11 is sealed along its length as indicated by the numeral 14. Of course, the particular sealing material 14 will depend upon the material of which the tubular portion 11 is formed. For example, in a preferred form of the invention, the tubular portion 11 is a plastic material having spaced openings such as in a mesh and, therefore, the seal 14 may be provided by a suitable chemical solvent such as acetone or the seal 14 may be provided by the application of heat by any of the methods known in the art.

Of course, it is understood that the tubular portion 11 may be formed of a metal, if desired, making appropriate provisions for electrically insulating the housing 10 from the unit or element to be contained therein, and therefore, a suitable seal 14 for a metallic tubular portion 11 may be a solder or brazing material.

It should be noted that the end 12 extends from the inner surface of tubular portion 11 and terminates short of the diametrically opposed inner surface of the tubular portion 11 to define a slot 15 and two chambers 16 and 17 formed by the partition.

Opposite ends of the tubular portion 11 are sealed by caps 18 and 19, respectively, and the cap 19 is provided with a centrally disposed opening 20 through which electrical leads 21 and 22 are passed for connection with the electrical unit 23. Each of the end caps 18 and 19 is formed to fit over the tubular portion 11 of the housing 10 to avoid interference with the partition, or, if inserted within the ends of the portion 11, suitably placed notches (not shown) must be provided to fit around the partition.

The electrical unit 23 for use with the housing 10 is of a tape-like form to provide either a heating element or an illuminating element, as desired. Of course, any other form of electrical unit 23 may be used with the housing 10 of the invention since the partition uniquely provides electrically insulated chambers and, if needed, a support for the unit 23.

An example of a tape-like flexible heating element comprises woven fibrous glass tape having conductive silicone rubber in the interstices and electrical conductors along the longitudinal edges. When using such a heating tape electricity flows across from one longitudinal edge to the other, producing heat since the tape itself is resistive. It is a commercially available product known to those skilled in this art. Alternatively other conductive plastics, such as the conductive rubbers and polyvinyl fluoride polymers formed into a tape having suitable resistive properties may be used.

Figure 2:
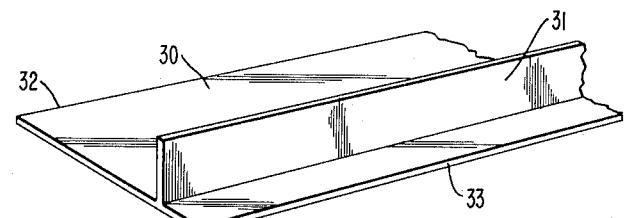
FIG. 2 is a perspective partial view of a portion of a sheet formed in accordance with the invention.

A construction in accordance with one form of the invention may be provided by an extruded strip, which strip has an upright portion 31 formed integrally therewith and located intermediate the elongated edges of the strip. An example of such a strip is shown in FIG. 2. The strip 30 may be formed continuously in one extrusion, and the numerals 32 and 33 indicate, respectively, opposite elongated edges of the strip 30.

Figure 3:
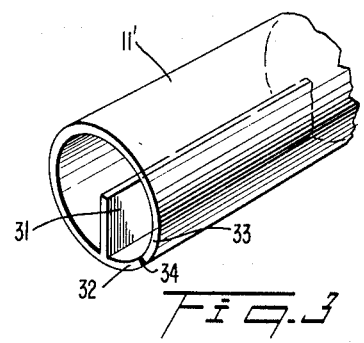
FIG. 3 is a perspective partial view of a housing in accordance with the invention constructed from the sheet shown in FIG. 2.

Referring now to FIG. 3, which shows a housing 11' as formed from the strip 30 shown in FIG. 2, the opposite elongated edges 32 and 33 being sealed as indicated by the heavy line 34. The upright portion formed directly and integrally with the strip 30 provides the partition 31 extending part way across the diameter of the tubular portion 11', as described previously in connection with the form shown in FIG. 1.

It will be understood that the completed housing 11' may be formed directly in a single operation by extrusion, thus eliminating the need for a seal 34. This indicates that various and different methods of manufacture may be used to form a housing in accordance with the invention. Also the particular configuration of the cross section may take other and different forms, another form being shown by the square cross section in FIG. 5.

Figure 4:
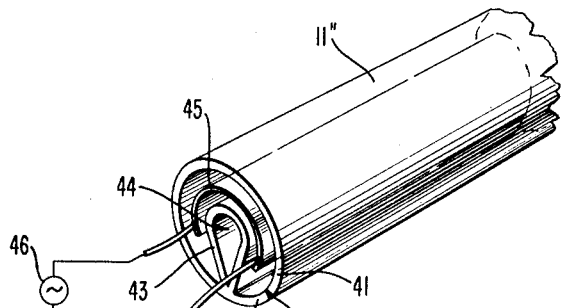
FIG. 4 is a perspective partial view of a modification in accordance with the invention.

If desired, the partition 31 shown in FIG. 3 may be formed with an opening extending axially therethrough. Such an arrangement is illustrated in FIG. 4 of the drawing, wherein an elongated tubular portion 11" is provided with opposite edges 40 and 41 sealed in a manner indicated by the heavy line 42 similar to that described in connection with FIG. 3. The partition 43 is provided with an axially extending opening 44, and the outer surface of the partition 43 provides either a support or insulation between the terminals for an electrical unit 45 as described previously.

With the form of the invention as shown in FIG. 4, the central channel 44 may be used, for example, to circulate a cooling medium. Many examples will be immediately apparent of a use for a heat transfer unit such as is provided by the arrangement of FIG. 4. One such use would be in refrigeration devices.

When the housing of the invention is used to enclose an electrical, tape-like heating unit, the housing may be embedded in, for example, a driveway for snow and ice removal, and the housing may be sealed and submerged to heat a pool of water. Alternatively, when the housing is used to enclose an electrical, tape-like luminescent or phosphorescent material, a plastic or glass material is used to form the housing, and the housing is mounted in any desired lengths since the electrical connections are at only one end.

As with the previously described forms of the invention, a suitable source of electrical energy 46 may be connected to one end of the unit 45.

Figure 5:
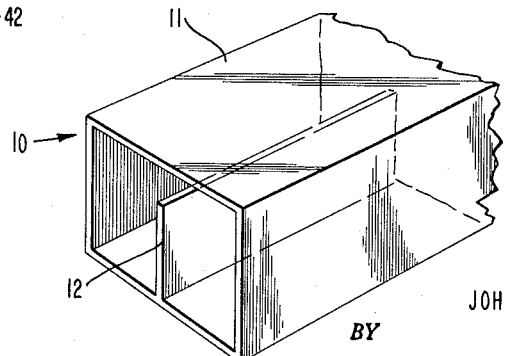

In FIG. 5, the housing or enclosure and partition therein are the same, generally, as shown and described previously. Therefore, the reference numerals 10, 11 and 12 are used in FIG. 5 to represent parts which correspond to similar parts found in, for example, FIG. 1. Also, the housing of FIG. 5 is formed by extrusion, and therefore, no longitudinal seam is shown.

In the preferred embodiment of FIGS. 6 and 7, the electrical unit is shown as comprising a flexible heating tape 50 having conductive longitudinal edges 53 and 54. Electrical energy is applied through conductors 22 which are joined to conductive edges 53 and 54 at connections 51 and 52.

The housing 55 is formed of a plastic material having a pattern of repeating openings or interstices 56 such as an open mesh, braid or net formed in a suitable manner. The housing 55 may be termed as an open spiral mesh formed by winding extruded polypropylene filaments at opposite pitches. In the embodiment shown, plastic filaments 57 and 58 are made from a polypropylene polymer although other plastics which are heat resistant (do not melt easily) such as thermosetting polymers may be utilized so long as they are non-conductive. The heating tape 50 is supported in position by the inner walls of housing 55. Dotted lines 59 indicate that a barrier or partition is used extending from the inner surface of housing 55 in a direction approximately towards but not touching the diametrically opposed inner wall.

The barrier serves to prevent the longitudinal conductive edges 53 and 54 from contacting each other and shorting the circuit. Staples 61 may be used to fix the heating tape in position and a front cap 62 fits into the end opening of housing 55 as shown in FIG. 7 to complete the enclosure.

In the case in which more than one electrical element is to be used, the tubular member may be formed into a plurality of internal sections or chambers as by providing a series of radially spaced ribs which are connected to the interior of the housing. Between such ribs it will then be necessary to utilize an insulating ridge or partition in the manner heretofore described. In such case, the electrical element would be folded and positioned within the sections the longitudinal ends of which will be held in spaced apart insulating relationship by the aforementioned insulating ridge.

In the embodiment of FIG. 8, a plurality of heating tapes 50, 50', 50" are arranged radially within sectors or chambers 62 formed by radially extending walls or partitions 63. These walls may be formed as a disc, a plurality of which may be spaced longitudinally apart within housing 55. The walls 63 are made of an insulative material. Other sector forming means may be used as will be apparent to those skilled in the art.

A plurality of barriers are positioned in each of the radial sections 62 respectively and are secured to the inner wall of housing 55. Barriers 59' serve to keep the conductive edges 53 and 54 apart. This arrangement allows for a more concentrated type of heat radiation.

While the invention has been described and illustrated in several forms thereof, it is understood that variations and modifications may be made therein in view of this disclosure, and that all such variations and modifications are included within the scope and purview of the claims appended hereto.

I claim:

1. A housing for an electrical unit comprising
   an outer tubular portion of predetermined length and diameter and formed of a plastic material,
   said plastic being non-conductive and substantially heat resistant and having a plurality of spaced apart openings on the surface thereof,
   an insulating partition formed integrally along one edge of said outer tubular portion and having a length extending substantially throughout the length of said outer tubular portion,
   and the width of said partition being less than the diameter of said outer tubular portion and being spaced from the diametrically opposed inner edge of the tubular portion.

2. A housing for an electrical unit comprising
   an outer tubular portion of predetermined length and diameter and formed of a plastic material,
   a partition formed integrally along one edge of said outer tubular portion and having a length extending substantially throughout the predetermined length of said outer tubular portion,
   and the width of said partition being less than the diameter of said outer tubular portion and being spaced from the diametrically opposed inner edge of the tubular portion,
   and a flexible tape-like electrical element supported within said tubular portion,
   said electrical element having conductive means along the longitudinally extending edges,
   and said partition being interposed between said edges.

3. A housing for an electrical unit comprising
   an outer tubular portion of predetermined length and diameter,
   a partition formed integrally along one edge of said outer tubular portion and having a length extending substantially throughout the predetermined length of said outer tubular portion,
   the width of said partition being less than the diameter of said tubular portion to define a slot extending throughout the length of said outer tubular portion,
   and said partition and said outer tubular portion defining two communicating chambers extending throughout the length of said housing to receive an electrical unit.

4. A housing for an electrical unit comprising
an outer tubular portion of predetermined length and diameter,
a partition formed integrally along one edge of said outer tubular portion and having a length extending substantially throughout the predetermined length of said outer tubular portion,
the width of said partition being less than the diameter of said tubular portion to define a slot extending throughout the length of said outer tubular portion,
and said partition and said outer tubular portion defining two communicating chambers extending throughout the length of said housing to receive an electrical unit,
and a flexible tape-like electrical element supported within said tubular portion,
said electrical element having conductive means along the longitudinally extending edges and coextensive therewith,
said conductive means being supported in each of said respective chambers.

5. The housing of claim 4 having two connecting wires connected to each of said conductive means.

6. A housing for an electrical unit comprising
an outer tubular portion of predetermined length and diameter and formed of a plastic material,
a partition formed along one edge of said outer tubular portion and having a length extending substantially throughout the predetermined length of said outer tubular portion,
said partition having a channel therein extending longitudinally throughout its length, and the width of said partition being less than the diameter of said tubular portion.

7. A housing for an electrical unit comprising
an outer tubular portion of predetermined length and diameter and formed of a non-conductive plastic material having a pattern of openings in the surface thereof,
a partion formed integrally along one edge of said outer tubular portion and having a length extending substantially throughout the predetermined length of said outer tubular portion,
said partition having a channel therein extending longitudinally throughout its length, and the width of said partion being less than the diameter of said tubular portion.

8. A housing for an electrical unit comprising
an outer tubular portion of predetermined length and diameter and formed of a non-conductive plastic material having a pattern of openings in the surface thereof,
a partition formed along one edge of said outer tubular portion and having a length extending substantially throughout the predetermined length of said outer tubular portion,
said partition having a channel therein extending longitudinally throughout its length, and the width of said partition being less than the diameter of said tubular portion,
and a flexible tape-like electrical element supported within said tubular portion,
said electrical element having conductive means along longitudinally extending edges,
and said partition being interposed between said edges.

9. The housing of claim 6 in which said electrical element comprises a heating tape.

10. The housing of claim 1 in which said tubular portion has internal sectional means forming a plurality of substantially radial chambers, an an insulating partition for each chamber.

11. The housing of claim 10 in which electrical elements having conductive means along longitudinally extending edges are positioned in each of said chambers and said insulating partition in each chamber retains said conductive means in spaced apart relationship.

12. The housing of claim 11 in which said electrical element comprises a heating tape.

13. The housing of claim 12 having end closure caps closing the ends of said tubular portion.

14. The housing of claim 13 having conductive wires passing through a receiving aperture in one of said caps.

References Cited in the file of this patent
UNITED STATES PATENTS

| | | |
|---|---|---|
| 1,267,879 | Levin | May 28, 1918 |
| 1,506,065 | Hynes | Aug. 26, 1924 |
| 1,728,091 | Whittingham | Sept. 10, 1929 |
| 1,974,888 | Barclay | Sept. 25, 1934 |
| 2,076,286 | Warren et al. | Apr. 6, 1937 |
| 2,396,099 | Hartwell | Mar. 5, 1946 |
| 2,708,176 | Rhodes | May 10, 1955 |
| 3,038,205 | Plummer | June 12, 1962 |

UNITED STATES PATENT OFFICE
CERTIFICATE OF CORRECTION

Patent No. 3,163,842                December 29, 1964

John C. Wittwer

It is hereby certified that error appears in the above numbered patent requiring correction and that the said Letters Patent should read as corrected below.

Column 5, line 43, and column 6, line 1, for "partion", each occurrence, read -- partition --.

Signed and sealed this 18th day of May 1965.

(SEAL)
Attest:

ERNEST W. SWIDER                       EDWARD J. BRENNER
Attesting Officer                        Commissioner of Patents